(No Model.)
M. W. FORBES.
COMBINED TRUCK AND JACK.
No. 368,883. Patented Aug. 23, 1887.
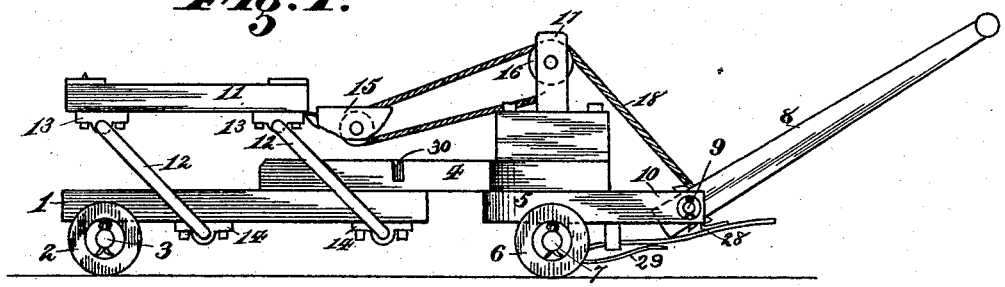
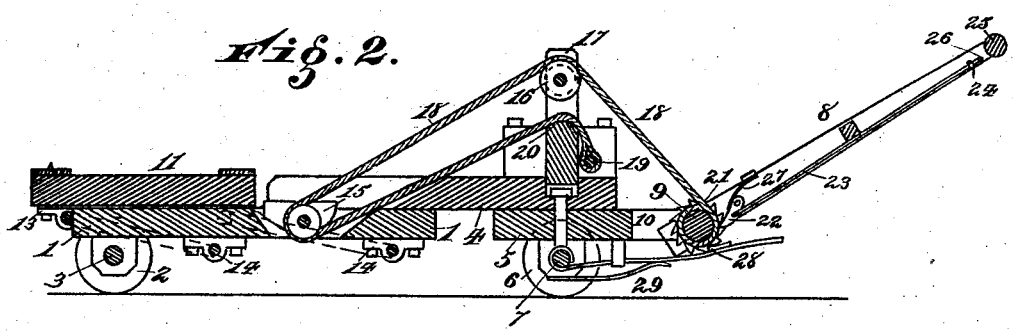
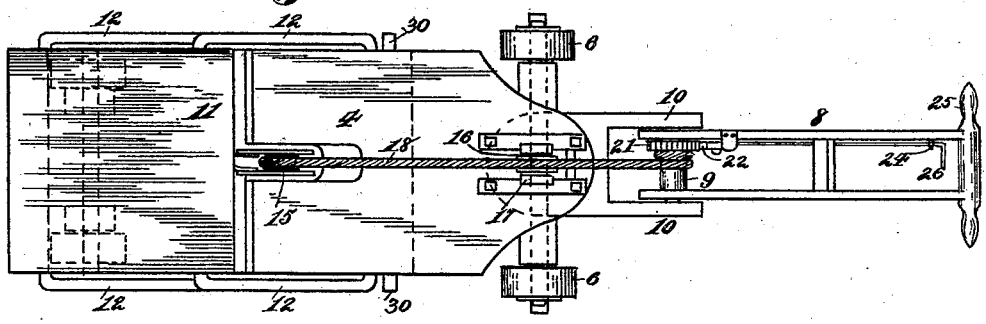
Attest
J. Watson Sims
Ed Besuden
Inventor
Martin W. Forbes
by Wood & Boyd
his Attorneys

UNITED STATES PATENT OFFICE.

MARTIN W. FORBES, OF MIAMISBURG, OHIO.

COMBINED TRUCK AND JACK.

SPECIFICATION forming part of Letters Patent No. 368,883, dated August 23, 1887.

Application filed January 31, 1887. Serial No. 226,083. (No model.)

*To all whom it may concern:*

Be it known that I, MARTIN W. FORBES, a resident of Miamisburg, in the county of Montgomery and State of Ohio, have invented certain new and useful Improvements in Combined Truck and Jack, of which the following is a specification.

The object of my invention is to construct a truck with a carrying-platform mounted upon devices which will allow the platform to be elevated at will, and thereby raise the goods up. It may be adapted to haul and elevate barrels, boxes, reapers, mowers, mechanical machines, and various heavy articles which require the use of a low-down truck on which to place the articles for carriage.

The various features of my invention will be fully set forth in the description of the accompanying drawings, making a part of this specification, in which—

Figure 1 is a side elevation of my improvement, showing the platform partially elevated. Fig. 2 is a longitudinal central section of the same, showing the platform depressed; and Fig. 3 is a top plan view of the same.

The preferred form of making the truck is to make it a four-wheeled device, having the two front wheels journaled upon an axis attached to the swiveling frame and provided with a tongue after the manner of constructing wagons, and, second, to employ the tongue as a lever for raising the platform.

In the drawings, 1 represents the main frame; 2, the rear ground wheels or rollers; 3, the axle upon which they are journaled, which axle is rigidly attached to the main frame or platform 1. This frame 1 may be of any desired form of construction.

4 represents an upward extension of the main frame, which is preferably mounted upon and rigidly attached to the main frame 2. This elevation of the front portion is for the purpose of allowing the front wheels to move under it for the purpose of turning and directing the course of the truck.

5 represents the front frame, which is supported by means of the ground or cast wheels 6 and the axle 7, which is rigidly connected to the frame 5, which is attached by a swivel or king bolt to the elevated frame 4.

8 represents a tongue journaled upon the roller 9, which is in turn journaled in the forks 10 of the front frame.

11 represents the carrying-platform. It normally rests upon the main frame 1, as shown in Fig. 2. It is attached thereto by means of the links 12, which journal in the bearings 13, attached to the under side of the platform 11 at one end, and in bearings 14 on the under side of the main frame. In order to elevate this platform with its sustained load I prefer to employ a block and tackle, which is preferably operated in the following manner:

15 represents a block carrying a pulley and is rigidly attached to the platform 11.

16 represents a pulley journaled in a bracket, 17, rigidly mounted on the front end of the elevated frame 4.

18 represents a rope or chain one end of which is rigidly fastened to the lug or hook 19, passing from thence over a saddle, 20, around the pulley in block 15, thence around over the pulley in block 17, and thence around the roller 9, upon which the tongue is swiveled.

21 represents the ratchet-wheel, rigidly connected to the roller 9.

22 represents a spring-pawl engaging with the teeth of the ratchet-wheel. It is attached to and moves with the tongue 8.

23 represents the ratchet-rod, hinged to the pawl between its pivot and its point and extending back to the staple 24, near the handle 25 of the tongue, and bent to form a catch, 26, at the ends, so as to be readily taken hold of by the hand and pulled to draw the pawl 22 out of engagement with the teeth of ratchet-wheel 21.

27 represents the spring for holding the pawl normally in engagement with said teeth.

28 represents a holding-pawl. It is placed upon a spring-rod, 29, projecting forward under the ratchet-wheel 21, the spring holding the stop normally in engagement with the ratchet-teeth.

Mode of operation: The preferred form of elevating the platform 11 and its sustained load is by employing the tongue 8 as a lever to jack up the load. When the tongue is thrown back, the pawl 22 rides over the ratchet-teeth and forms a new engagement. As the tongue is pulled down, it drives the ratchet-wheel forward and winds the rope 18 around the roller 9, pulling the platform 11 forward and upward, it rising upon the links 12, turning in their journals. The pawl 22 is tripped by the pawl-rod 23 and the tongue turned back for the second engagement. This jacking up of the load is continued until the platform has been raised up the desired height. 30 represents lugs or stops on the frame 4 for arresting the forward movement of the links 12 and holding it in a fixed elevated position. When it is desired to release or lower the platform, the operator withdraws the pawl 22 and the stop-pawl 28, when the platform is free to descend, or the operator may lower the load by releasing the pawl 28, keeping the pawl 22 in engagement with the ratchet-wheel, while the tongue or lever 8 is carried back to a vertical position, and pawl 28 is re-engaged, pawl 22 is disengaged, and the lever or tongue drawn forward and down for the new engagement and a second step in lowering. In the elevation of light loads the rope or cord 18 may be pulled by hand and the platform raised in the same manner as ordinary tackle and blocks are employed; but the lever or tongue 8 and the ratchet-and-pawl devices form a very powerful lever-jack, and large weights can be easily raised thereby.

I do not desire to limit myself to the specific form of constructing the frame devices herein shown; but

What I claim as my invention is—

1. The combination of the truck-frame 1, the platform 11, connected therewith by the links 12, the tackle-block 15, connected to the front end of the platform, the pulley-block 17 at the front of the truck-frame, the roller 9, the pawl and ratchet for rotating said roller, and the cable 18, connected at one end with the truck-frame, passing around the tackle-block on the platform and the pulley-block and connected to said rotating roller, substantially as described.

2. The combination, with the truck-frame, platform, and the tackle-block 15, connected to the front end of said platform, of the roller 9 on the truck-frame, the swinging tongue 8, pivoted on said roller, the cable 18, connected with the roller and truck-frame and passing around the tackle-block on the platform, and ratchet-and-pawl devices on the roller and tongue, respectively, for elevating and holding the platform, substantially as described.

In testimony whereof I have hereunto set my hand.

MARTIN W. FORBES.

Witnesses:
AMOS K. CLAY,
JAMES C. EMLEY.